E. B. ALLEN.
BUTTONHOLE CUTTING AND STITCHING MACHINE.
APPLICATION FILED MAR. 6, 1913.
1,179,378.
Patented Apr. 11, 1916.
5 SHEETS—SHEET 2.
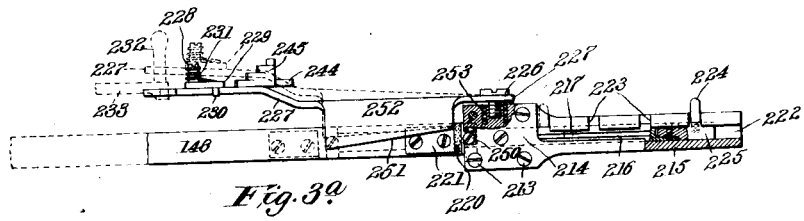
Fig. 3ª
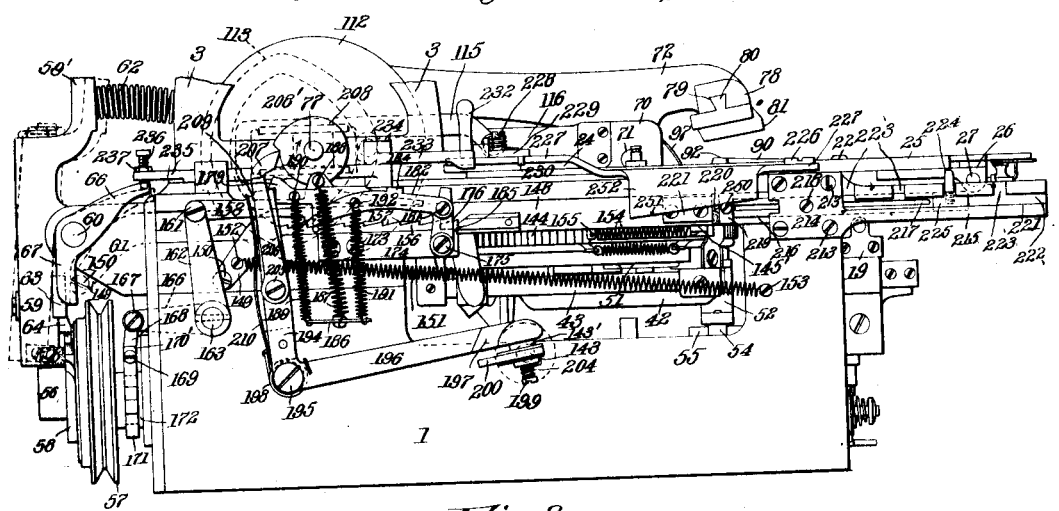
Fig. 3.
Fig. 22.
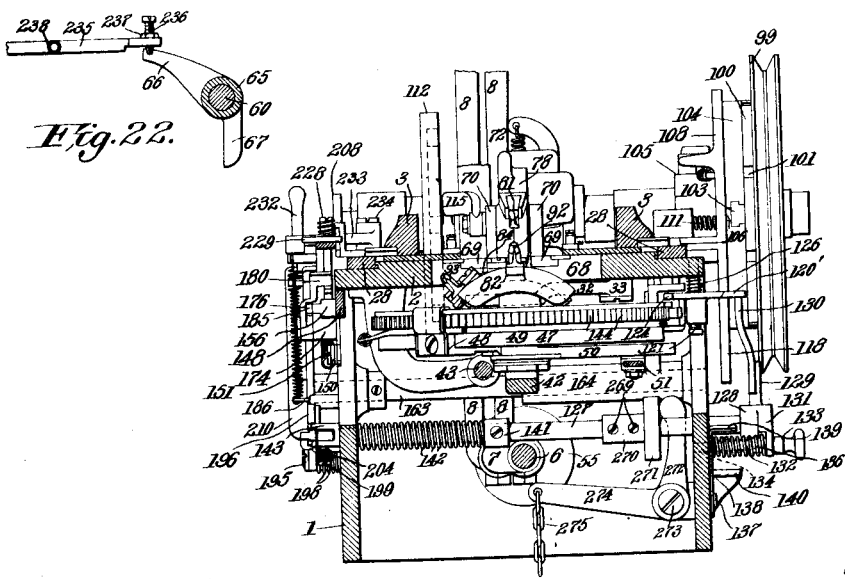
Fig. 4.
WITNESSES:
L. E. Fischer
Gera L. Ferran
INVENTOR
Edward B. Allen
BY
Henry J. Miller
ATTORNEY E. B. ALLEN.
BUTTONHOLE CUTTING AND STITCHING MACHINE.
APPLICATION FILED MAR. 6, 1913.
1,179,378.
Patented Apr. 11, 1916.
5 SHEETS—SHEET 3.
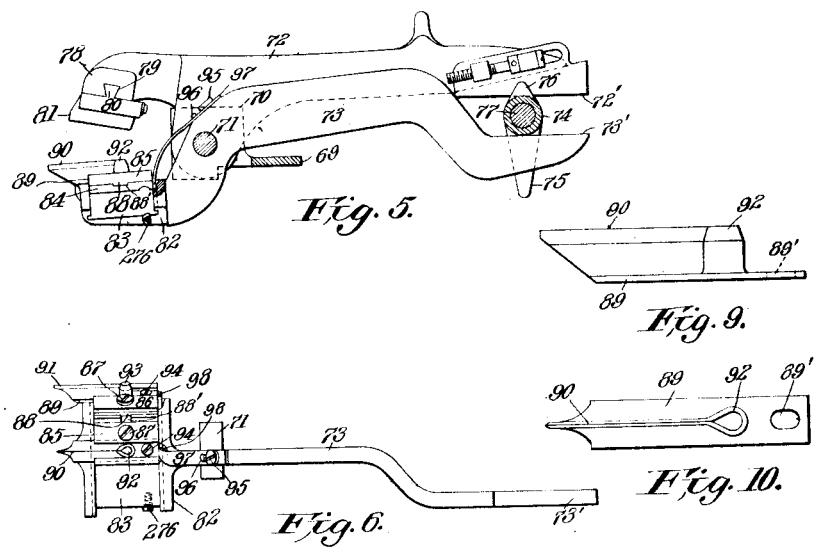
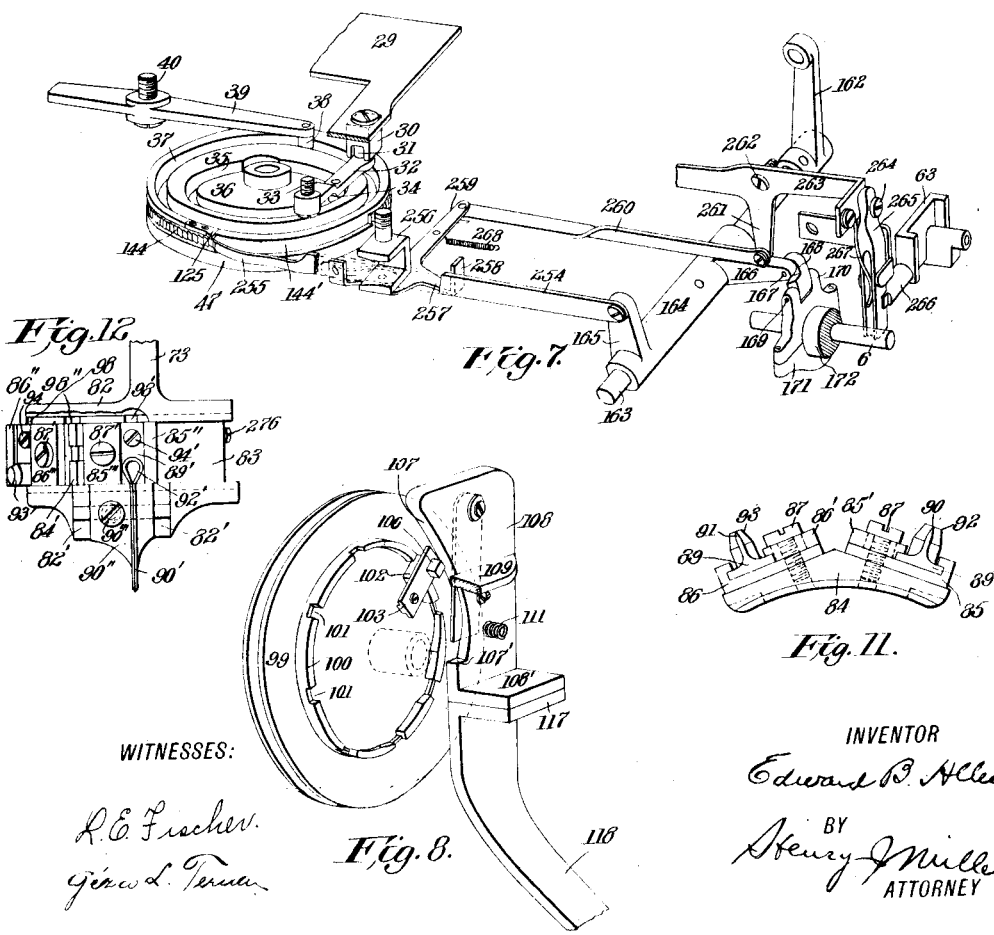

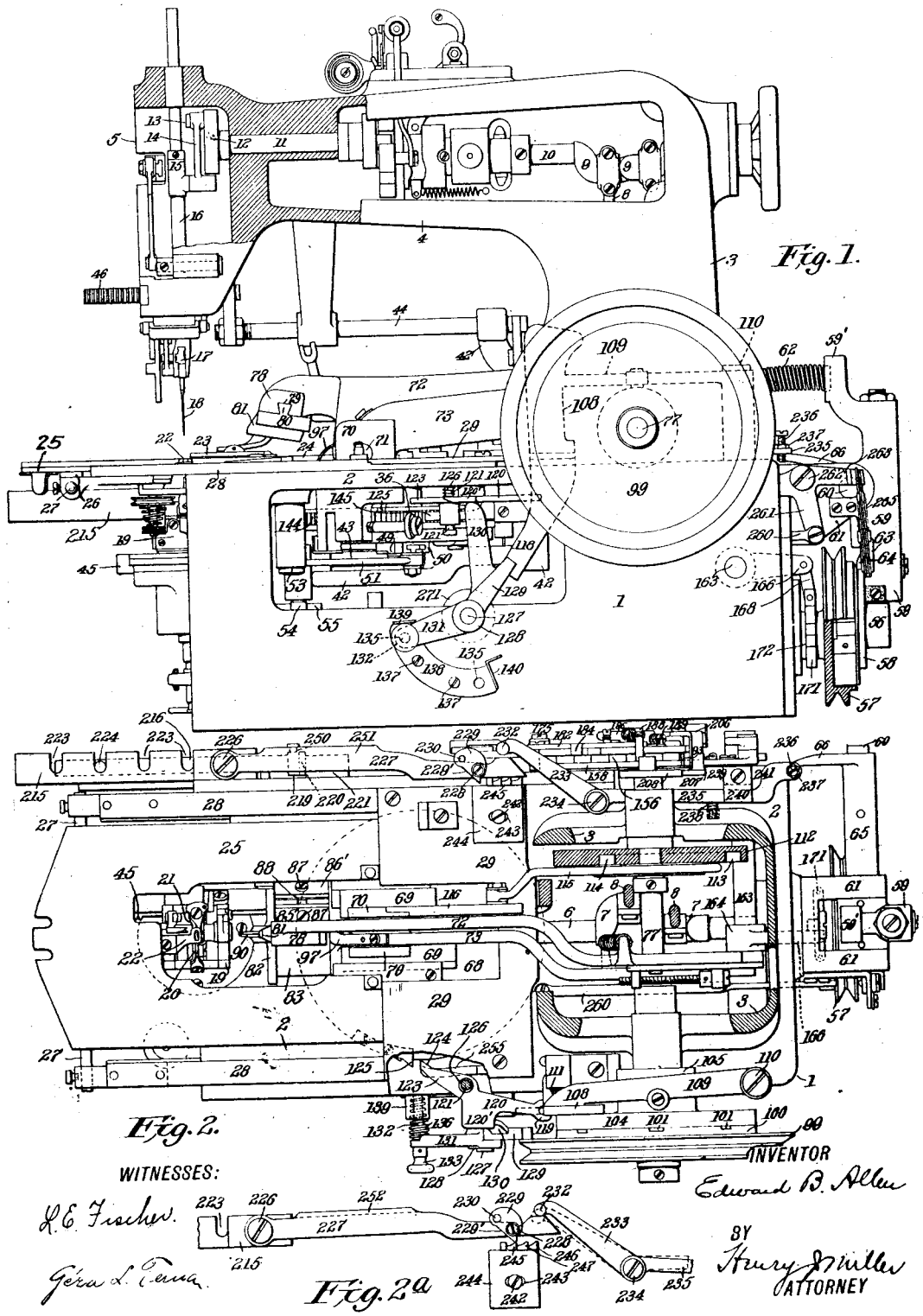

E. B. ALLEN.
BUTTONHOLE CUTTING AND STITCHING MACHINE.
APPLICATION FILED MAR. 6, 1913.
1,179,378.
Patented Apr. 11, 1916.
5 SHEETS—SHEET 4.
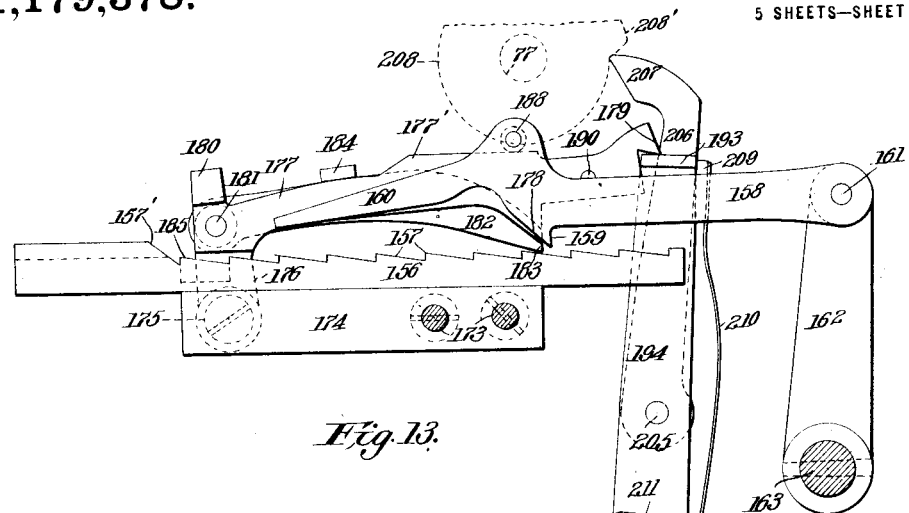
Fig. 13.
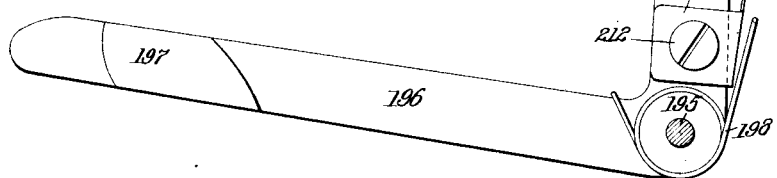
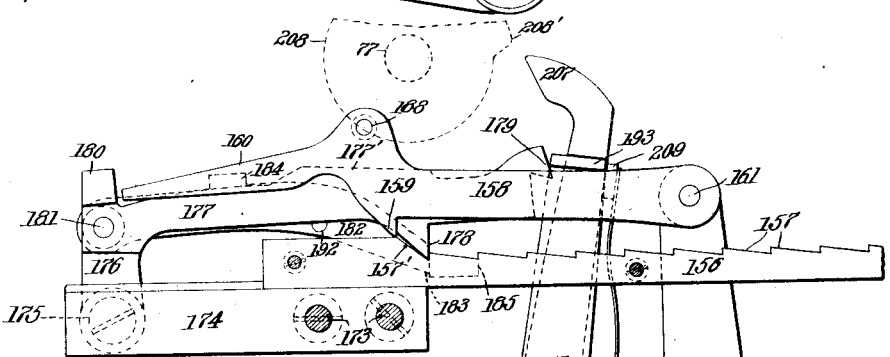
Fig. 14.
WITNESSES:
L. E. Fischer
Gira L. Ferma
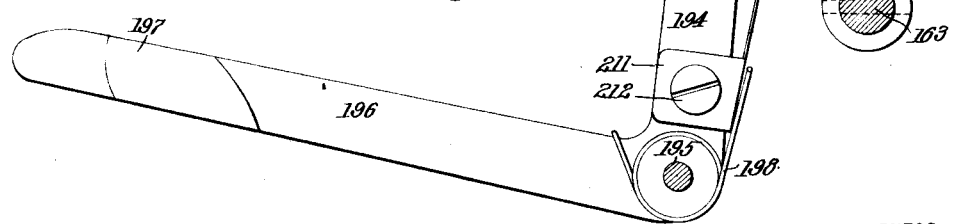
Fig. 15.
INVENTOR
Edward B. Allen
BY
Henry Muller
ATTORNEY

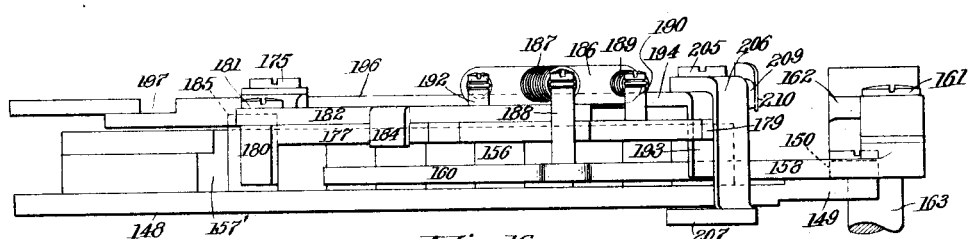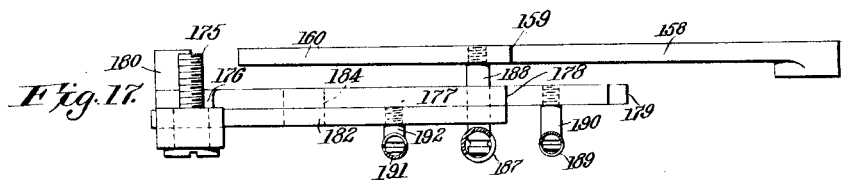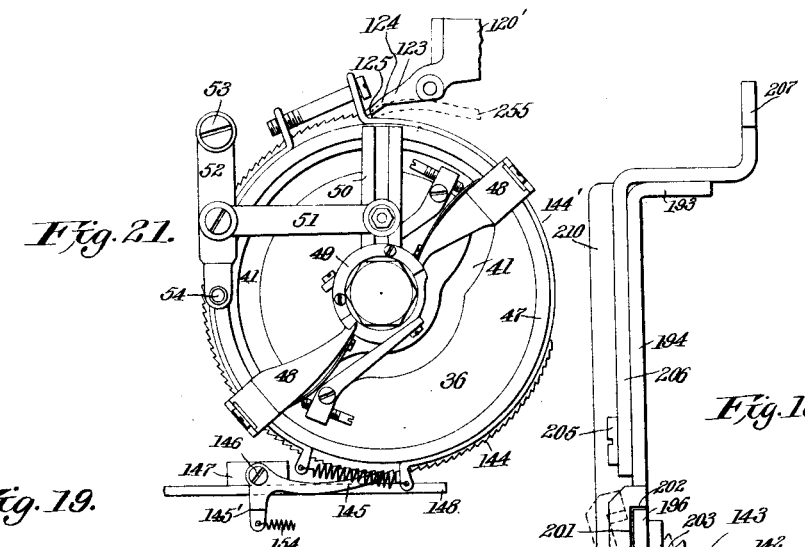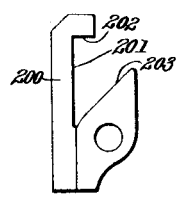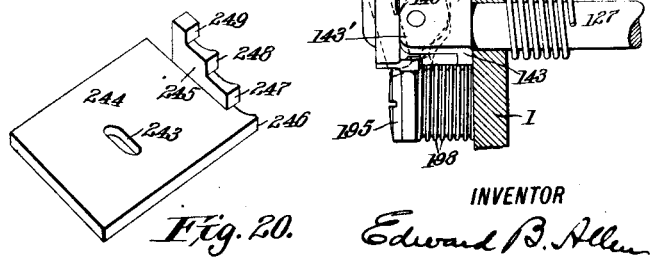

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE CUTTING AND STITCHING MACHINE.

1,179,378.  Specification of Letters Patent.  Patented Apr. 11, 1916.

Application filed March 6, 1913. Serial No. 752,257.

*To all whom it may concern:*

Be it known that I, EDWARD B. ALLEN, a citizen of the United States, residing at Bridgeport, in the county of Fairfield and State of Connecticut, have invented certain new and useful Improvements in Buttonhole Cutting and Stitching Machines, of which the following is a specification, reference being had therein to the accompanying drawings.

This invention relates to an improvement in buttonhole cutting and stitching machines, and particularly to machines of that class in which the stitch-forming mechanism performs turning movements relatively to the work-holder and the cutting device in stitching around the enlarged end of an eyelet buttonhole.

The invention has for its primary object to provide means whereby in a single organism of the class described the order of operation of the stitching and cutting mechanisms may be varied to suit the class of work required.

To insure the greatest possible neatness of the work it is of course desirable that the cutting action precede the stitching or edge-covering operation, but under certain conditions, and particularly in connection with the production in cloth garments of buttonholes stitched along the edges with a very narrow overseam, it is often necessary to perform the stitching first and to cut the slit intermediate the lines of side stitching so as to prevent the pulling out of the stitches and fraying of the cut edge of the goods which would occur in case the buttonhole slit were cut in advance of the stitching. By providing a machine with means whereby the order of the cutting and stitching may be reversed, the scope of practical operation of a single machine is greatly enlarged over that of machines of this kind heretofore in use.

In the production of straight buttonholes, the same cutting elements may be actuated either before or after the stitching operation, but with eyelet end buttonholes the size of the portion of material removed for the eye should be greater when the stitching is performed subsequently to the cutting action than before, thereby requiring the employment of different cutting elements to correspond with different timings of the cutting and stitching mechanisms. This condition exists because, while the spreading of the slit laterally serves to draw its margin beyond the needle path in its edge thrust, no provision is made in existing machines for stretching the material endwise of the slit so that the margin of the eye portion will escape puncture by the needle in the laying of the covering stitches thereon. According to the present invention, in its preferred form, one of the cutter-carrying members is provided with a plurality of cutting elements adapted to be shifted into and out of cutting position thereon for coöperation with a cutting element of an opposed cutter-carrying member, and these cutting elements are adapted to be shifted to bring them alternately into cutting position so that a slit of the proper form and character may be cut to correspond with the relative timing of operation of the cutting and stitching mechanisms.

In its preferred form, the present improvement is embodied in a Singer eyelet end buttonhole machine of the general type and construction represented in my pending application Serial No. 718,804, filed September 6, 1912. In the machine referred to, the work-holder assumes an initial cutting position intermediate stitching position and the retracted position of the traveling cutting device, in which initial position the cutting operation invariably takes place either preparatory to the movement of the work-holder into stitching position to present the work to the stitch-forming mechanism, or upon its return to such initial position after the completion of a stitch-forming operation. Actuating means are provided for imparting operative movements to the stitch-forming mechanism and to the feed-wheel which communicates traveling movements to the work-clamp and partial rotary movements to the stitch-forming mechanism, and actuating means independent thereof are provided for imparting to the cutting device its traveling and fabric cutting movements. Means are provided for producing in each cycle of operation of the machine a single operation of the cutter-actuating mechanism which is employed to set in motion the feed-wheel for shifting the work-holder to stitching position. This movement of the work-holder is used in the shifting of the controlling lever of the stop-motion to set the stitching mechanism in operation and effect the normal feeding of the work-holder to space the stitches, after which means carried by and moving with the traveling work-holder causes the tripping of the stop-motion to arrest the action of the stitch-forming mechanism, the work-holder being thereafter returned to initial position.

In the preferred embodiment of the present improvement, an endwise movable starting rod is mounted in the machine base and carries tripping means adapted to act either directly upon the cutter-actuating means or indirectly through auxiliary feed-wheel controlling means to inaugurate the performance of a buttonhole cutting and stitching cycle in an order dependent upon the adjustment of the starting rod to bring one or the other of its tripping means into register with the part with which it is designed to coöperate. Means are provided for preventing a second operation of either the cutting or stitching mechanism after an initial action.

In the present embodiment, the cutting elements are carried by a pair of cutter-carrying levers mounted upon a traveling fulcrum, and one of which is provided with a flat faced block or anvil while the other is provided with a transverse guideway in which is fitted a laterally sliding block provided with spaced and removable cutting knives each formed at one end with an eye portion of different size from that of the other so as to compensate in its cutting action in connection with the common cutter-block or anvil for different timing of action of the cutter mechanism relatively to the stitch-forming mechanism, the cutter-carrying slide-block being adapted to be shifted to bring the appropriate cutting element into register with the complemental cutter-block.

The invention will be understood by reference to the accompanying drawings, in which—

Figure 1 is a front side elevation of a buttonhole cutting and stitching machine embodying the present improvements, Fig. 2 a plan of the same with the bracket-arm removed, and Fig. 2ᵃ a side elevation of the stop-motion tripping means. Fig. 3 is a rear side elevation of the base of the machine and the parts carried thereby, Fig. 3ᵃ a similar view of a portion of the push-bar and stop-motion controlling means, and Fig. 4 a transverse section of the lower part of the machine. Fig. 5 is a side elevation of the cutting device and Fig. 6 a plan of the lower member thereof. Fig. 7 is a perspective view representing the feed-wheel and the stop-motion mechanism. Fig. 8 is a perspective view of the controlling means for the cutter-actuating shaft. Fig. 9 is an elevation and Fig. 10 a plan of one of the lower cutting elements, and Fig. 11 a front end view of the cutter-sustaining slide-block with the cutters mounted thereon. Fig. 12 is a plan of a modification of the parts shown in Fig. 6, but upon a larger scale. Figs. 13 and 14 are front side views, upon an enlarged scale, of the means for controlling the initial travel of the work-holder from cutting to stitching position and Fig. 15 a plan of a portion of the rack-bar constituting an element of said means. Fig. 16 is a plan of said controlling means, Fig. 17 a bottom view of a portion of the same, and Fig. 18 a front edge view of another portion thereof. Fig. 19 is a detached side elevation of the rocking cam-plate of the starting rod. Fig. 20 is a perspective view of a member of the stop-motion tripping device. Fig. 21 is a bottom view of the feed-wheel and its actuating means. Fig. 22 is a side view of a portion of the stop-motion controlling means.

The machine is shown constructed with the hollow base 1 affording the bed-plate 2 from which rises the hollow standard 3 with tubular overhanging arm 4 terminating in the head 5. Journaled in and longitudinally of the base is the main-shaft 6 provided with quartering cranks 7 connected by means of the pitmen 8 with similar cranks 9 upon the upper shaft 10 journaled in the bracket-arm and connected by means of a trammel device with the needle-actuating shaft 11. The shaft 11, which rotates at twice the speed of the shafts 6 and 10, carries at its forward end the disk 12 provided with the crank-pin 13 connected by the pitman 14 with a lateral stud of the collar 15 upon the reciprocating needle-bar 16. Mounted upon the lower end of the needle-bar is the laterally jogging needle-clamp 17 carrying the eye-pointed needle 18. Journaled beneath the bed-plate is a rotary support 19 upon which is mounted the rocking carrier sustaining the loopers 20 and 21 directed toward each other and operating beneath the needle-throat 22. The looper-carrier derives its operative rocking movements from a connection with the forward extremity of the main-shaft 6.

The work-holder is composed of a pair of clamps disposed at opposite sides of the stitching line and each comprising an upper clamping foot 23 and the adjacent face of a clamp-plate 24 which in practice rests upon the laterally movable slide-plate 25 having the depending bearing lugs 26 fitted upon the cross rod 27 which is in turn sustained at the forward ends of the parallel side bars 28 of a longitudinally sliding frame having the cross member 29 by means of which the side bars are connected, the latter being fitted to a suitable slideway upon the bed-plate 2. The cross member 29 (Fig. 7) has a depending block 30 apertured to receive the stud 31 of a rock-lever 32 fulcrumed by means of the screw-stud 33 upon the under side of the bed-plate and carrying a roller-stud 34 which enters the feed cam-groove 35 of the feed-wheel 36 which latter is provided with the shift cam-groove 37 entered by the roller-stud 38 upon the rearward arm of the rock-lever 39 journaled upon the fixed fulcrum-stud 40 with a sliding pivotal connection between its forward arm and the slide-plate 25, these connections with the feed-wheel imparting to the work-holder the usual longitudinal feeding and side-shift movements for spacing the stitches and properly disposing them relatively to the buttonhole slit. In its lower face, the cam-wheel 36 has the cam-groove 41 which is in practice entered by a stud carried by a frame comprising a member 42 secured to the lower slide-bar 43 and extending upwardly for connection with the upper slide-bar 44. The slide-bars 43 and 44 are connected respectively with racks 45 and 46 meshing with toothed pinions of rotary bushings of the looper-carrier and needle-bar by means of which the upper and lower coöperating elements of the stitch-forming mechanism are turned through a semi-rotation in the stitching of the eye of the buttonhole. The feed-wheel is formed with a depending annular flange 47 engaged by the suitably notched cramping clutch-dogs 48 deriving operative movements from the hub 49 of the arm 50 connected by means of the pitman 51 with the rock-lever 52 journaled upon the fixed fulcrum-stud 53 and having a depending roller-stud 54 entering a cam-groove in the cam-cylinder 55 fixed upon the main-shaft 6 from which the feed-wheel derives its step-by-step feeding movements communicated to the work-holder for spacing the stitches during the operation of the stitch-forming mechanism.

Fixed upon the rearward end of the main-shaft is the hub 56 of the stop-motion clutch-wheel loosely fitted within a cavity of the continuously running grooved belt-wheel 57 and provided with means including a peripherally notched clutch-ring 58 whereby the normally coupled members 56 and 57 may be uncoupled. Coöperating with the clutch-ring 58 is the tilting stop-lever 59 mounted upon the rock-shaft 60 journaled in the fixed bracket 61 and having its lower portion normally pressed toward the clutch-ring 58 by means of the spring 62 interposed between an extension 59' at the upper end of the same and the bracket-arm standard 3. In practice the stop-lever 59 carries a spring-pressed slide-block 63 formed with a tooth 64 adapted to enter the peripheral notch of the clutch-ring for unclutching the parts 57 and 58 and positively arresting the rotation of the main-shaft when thus disconnected from the actuating means afforded by the belt-wheel 57. Fixed upon the rock-shaft 60 is the sleeve 65 provided at the rearward end with the angularly arranged tappet arms 66 and 67, the former being inclined forwardly and upwardly and the latter depending below the sleeve.

The bed-plate is formed in its central portion with a longitudinal opening 68 having marginal slide-ways to which are fitted the opposite edges of the sliding base-plate 69 formed with the spaced upright bearing lugs 70 sustaining the fulcrum-pin 71 upon which are mounted the hubs of the upper and lower cutter-levers 72 and 73 whose rearward ends have flat bearing portions 72' and 73' spaced apart vertically to embrace the collar 74 which has the oppositely extending and laterally offset cam projections 75 and 76 and which is secured upon the transverse cutter-actuating shaft 77. The upper cutter-lever 72 has a head 78 formed with a transverse dove-tail groove 79 in which is fitted the correspondingly shaped tongue of a block 80 having removably secured therein the flat-faced cutter-block or anvil 81 substantially as represented in my Patent No. 1,048,786, of December 31, 1912. The lower cutter-lever is formed with a head 82 having a transverse channel 83 with undercut edges in which is fitted the similarly formed endwise movable and detachable slide-plate 84 whose upper face comprises two convergently inclined surfaces affording seats for the cutter-carrying blocks 85 and 86 which are secured thereto by means of fastening screws 87 passing through slots therein and through the gibs 85' and 86' and tapped into the plate 84 upon which they are laterally adjustable and detachable for replacement by others when desired. The blocks 85 and 86 are formed upon the lower faces with tongues 88 entering corresponding grooves 88' in the seats therefor upon the slide-plate 84. Each of the blocks 85 and 86 is provided with a guideway transverse to the tongue 88 within which is fitted the base-plate 89 of one of the slit-cutting knives, which are formed with the straight sharp-edged portions or blades 90 and 91 terminating at the rearward ends in the substantially oval cutting edges of the punches 92 and 93, respectively, the former of these punches being of larger size than the latter, so as to cut out a larger section of material at the eye-end of the slit than the other. Each base-plate is formed with a slot 89' parallel with the cutting blade to receive the shank of a fastening screw 94 for securing it for endwise adjustment within the channel 83.

Secured upon the upper edge of the cutter-lever 73 above the fulcrum-pin 71 by means of the fastening screw 95 and steady pin 96 is the flat spring 97 whose free end is reduced in width and adapted to enter one of the detent notches 98 in the rearward edge of the slide-plate 84. By pressure upon the spring 97, its operative extremity may be retracted from one of the detent-notches 98 and the slide-plate 84 shifted suitably for moving one of the edged lower cutters or cutting elements laterally out of register with the upper cutting element 81 and the other lower cutting element into the position thus vacated, the lower cutting elements being thus made interchangeable in their relation with the coöperating upper cutting element 81. With cutters operating upon the shear principle, it would of course be necessary to provide both of the cutter-levers with a plurality of interchangeable cutting elements coöperating with those of the other cutter-lever.

The cutter-actuating shaft 77 carries upon its forward end the continuously driven loose grooved belt-wheel 99 having upon its inner face the annular rib 100 containing the peripherally spaced notches 101 adapted to be entered by a coupling tooth 102 upon a spring-pressed slide-block 103 mounted in a radial slideway of the clutch-disk 104 whose hub 105 is fixed upon the cutter-shaft. The slide-block is normally pressed outward into locking engagement with the belt-wheel, as represented in Fig. 8, and has upon its face opposite the tooth 102 a stud 106 adapted for engagement with the cam-shaped edge 107 of a plate 108 carried by a controlling lever 109 fulcrumed upon the fixed stud-screw 110. In completing a revolution, as the stud 106 rides down the cam edge 107, the slide-block 103 is pressed inwardly and the tooth 102 disengaged from its notch 101 of the belt-wheel just before the stud 106 encounters the stop-shoulder 107'. The controlling lever 109 is normally maintained in operative position to maintain the cutter-shaft disengaged from the actuating belt-wheel by means of the spring 111 interposed between a fixed part of the machine and the plate 108, and when retracted by means to be described, releases the stud 106 and permits the tooth 102 to snap into an adjacent notch of the belt-wheel flange so as to couple the cutter-shaft with the belt-wheel for a rotation which is interrupted by re-engagement of the stud 106 with the cam-edge 107.

The cutter-shaft 77 has fixed thereon the cam-disk 112 formed with a cam-groove 113 entered by the stud 114 of a link-bar 115 pivotally connected with a rearward extension 116 of one of the bearing lugs 70 by means of which traveling movements are imparted to the fulcrum-plate 69 and hence to the cutter-levers and the cutting elements carried thereby.

The cam-plate 108 of the controlling lever 109 is shown formed with a lateral flange 108' to the bottom of which is secured a similar flange 117 of a depending and forwardly extending arm 118. The upper portion of the arm 118 is embraced by a fork 119 upon an arm 120 of a trip-lever having its hub loosely fitted to the shouldered stud 121 depending from the bed-plate 2 and provided with an oppositely extending arm 123 having a wedge-shaped extremity 124 adapted for engagement with the tripping point 125 set into and secured within the upper face of the cam-wheel 36 at its periphery. The trip-lever is normally pressed downwardly upon the upper end of the head of the stud 121 and also laterally to maintain its extremity 124 in contact with the periphery of the feed-wheel by means of the coil-spring 126.

Mounted within suitable bearings in and transversely of the base 1 is the endwise movable starting rod 127 having secured upon its forward end the hub 128 of a plural-armed lever formed with the angularly arranged arms 129, 130 and 131. The upwardly and backwardly inclined lever-arm 129 is adapted, in one adjustment of the starting rod, for engagement with the lower end of the controlling lever arm 118, and in the same adjustment of the starting rod the rounded extremity of the upwardly extending lever-arm 130 is adapted for engagement with the lower face of an extension 120' of the trip-lever arm 120 to lift the trip-lever out of the path of movement of the tripping stud 125, as represented in Fig. 1, and a third arm 131 is formed in its outer end with an aperture for the endwise movable locking pin 132 passing loosely through the same. The pin 132 has fixed upon its forward end the knob 133 and its opposite end 134 is adapted to enter one of two apertures 135 formed in the base 1. The pin 132 is surrounded intermediate its enlarged extremity and the arm 131 by a spring 136 by means of which it is normally maintained in its locking aperture 135. Secured upon the base by means of screws 137 is the segmental stop-plate 138 formed with upturned lips 139 and 140 to afford stop-shoulders for the side of the pin 132 in the two positions of adjustment of the plural-armed lever 129, 130 and 131 and of the starting rod 127, the segment-plate 138 being formed with apertures corresponding with the apertures 135. The starting rod 127 has secured thereon intermediate its ends a thrust-collar 141 between which and the rear wall of the base 1 is interposed a surrounding spring 142 by means of which the starting rod is maintained normally in its forward position wherein a collar 143 upon its rearward end is maintained in contact with the rearward face of the base, as represented in Figs. 4 and 18.

In the machine represented in the accompanying drawings, as in that of my said pending application Serial No. 718,804, the feed-wheel is designed to impart to the work-holder a maximum travel for the longest buttonhole to be cut and stitched augmented by the length of travel from cutting position to initial stitching position for such a buttonhole. The machine completes each cutting and stitching cycle with the work-holder in its rearward or cutting position from which it travels by a quick movement to initial stitching position in which the stitch-forming mechanism begins its operation. In order to produce the rapid travel of the work-clamp from cutting to initial stitching position, auxiliary turning mechanism is employed to rotate the feed-wheel through a partial rotation before the primary feed-wheel actuating mechanism is thrown into action. According to the present construction, the periphery of the feed-wheel is formed with a segmental series of ratchet-teeth 144 adapted for engagement by the point of a pawl 145 fulcrumed upon the stud-screw 146 tapped into a block 147 which is sustained by the endwise movable push-bar 148 which is journaled in suitable bearings at the back of the base 1 and beneath the bed-plate 7. As represented more particularly in Fig. 3, the push-bar 148 has a downwardly inclined rearward end portion 149 carrying a lateral stud 150 adapted in the travel of the bar for engagement with the depending arm 67 of the stop-lever rock-shaft 60 by means of which the stop-lever may be shifted into starting position as represented in dotted lines in said figure. The push-bar is normally drawn forwardly into retracted position by a spring 151 connected at one end with a screw-pin 152 upon the push-rod member 149 and at the other end with a screw-stud 153 tapped into the bed 1. The pawl 145 is formed with a lateral arm 145′ having an aperture in which is secured one end of a spring 154 whose opposite end is attached to a stud 155 depending from the lower edge of the push-bar 148, and the pawl is thus maintained in operative relation with the periphery of the feed-wheel.

To the rearward side of the push-bar 148 is secured the rack-bar 156 having upon its upper side a series of teeth 157 of saw-tooth form, the teeth being directed forwardly. The foremost tooth 157′ of the series has a greater inclination than the others and extends above the tops of the other teeth, as represented particularly in Figs. 13 and 14. Disposed above and near one edge of the rack-bar is a pawl-lever 158 having a depending tooth 159 adapted for engagement with the teeth of the rack and formed in advance of such tooth with a forwardly projecting finger 160. The pawl-lever is pivotally attached at the end opposite said finger 160 by means of a screw-pin 161 to an upwardly extending crank-arm 162 fixed upon a rock-shaft 163 journaled in the machine base. Fixed upon the rock-shaft 163 within the machine base is a sleeve 164 provided with an upwardly extending crank-arm 165 and with a rearwardly extending crank-arm 166 pivotally connected by the screw-pin 167 with the upper end of a link 168 whose opposite end is pivotally secured by means of the pin 169 within a fork 170 of the split eccentric strap 171 embracing an actuating eccentric 172 formed upon the hub of the loose and continuously running belt-wheel 57. From the eccentric 172, the pawl-lever 158 derives a reciprocatory movement for each rotation of the belt-wheel 57 irrespective of the latter's operative connection with the main-shaft.

Secured to the side of the base by means of fastening screws 173 is a block 174 into the forward end of which is tapped the fulcrum-screw 175 embraced by the apertured boss of a depending arm 176 of the main holding pawl 177 formed intermediate its ends with the depending tooth 178 and at its free extremity with the rearwardly projecting hook 179. The main holding pawl or detent is thus constructed in the form of an elbow-lever; and is provided above the junction of its angularly disposed component members with a laterally extending lug 180 overhanging the rack-bar 156 and arranged above the normal path of reciprocation of the finger 160 of the pawl-lever 158.

Arranged slightly below the lug 180 of the main holding pawl is the laterally projecting screw-pin 181 embraced by and affording a fulcrum for the apertured forward end of the auxiliary holding pawl 182 which is wedge-shaped at its free extremity to afford a tooth 183 in register with the tooth 178 of the main holding pawl but disposed at one side thereof. The pawl 182 has a laterally projecting lip 184 which overhangs the upper edge of the main holding pawl and is adapted for engagement therewith when the latter is lifted from operative relation with the rack 156. The tooth 183 of the auxiliary holding pawl 182 is disposed above and at one side of the rack-bar 156, and lies only above the path of movement of a single tooth 185 extending laterally from the rack-bar in line with the final regular tooth, and remains idly in its relation to the rack-bar until in the endwise movement of the latter it is engaged by the lateral tooth 185.

Sustained upon the rear side of the base 1 is an apertured plate 186 to which is fastened one end of a spring 187 whose opposite end is attached to a screw-stud 188 carried by the actuating pawl-lever 158, by means of which spring the pawl-lever is drawn normally downward for operative engagement with the rack-bar. A second spring 189 is fastened at one end to said plate 186 and at the other end to a screw-pin 190 upon the main holding pawl 177, and a third spring 191 has one end attached to such plate 186 and the other end to a screw-pin 192 carried by the auxiliary holding pawl 182, the holding pawls being drawn downwardly also for engagement with the rack-bar 156. The screw-stud 188 of the actuating pawl-lever is adapted, when the main holding pawl 177 is lifted out of operative relation with the rack-bar, to rest upon the flat upper edge 177' of such holding pawl, whereby the actuating pawl-lever is adapted to reciprocate idly out of contact with the rack-bar, as represented in Fig. 13.

The several pawls are normally maintained in upper retracted position by engagement of the hook 179 of the main holding pawl with a detaining shoulder afforded by the top of the lateral lip 193 upon the upwardly extending arm 194 of an angle-lever fulcrumed upon the screw-stud 195 tapped into the base 1 and provided with a forwardly extending arm 196 which is shown formed near its outer end with a transverse clearance groove 197. The hub of the lever 194 196 is surrounded by a coil-spring 198 by means of which the lateral arm 196 is pressed downwardly to cause its lower edge to rest upon the extremity of the side face or edge of the forked portion 143' of the collar 143 upon the starting rod 127. Within the fork 143' is pivotally mounted by means of the pin 199 a rocking cam-plate 200 formed with a recess 201 having an abrupt shoulder 202 at its upper end and an upwardly inclined shoulder or cam edge 203 at its lower end. When the starting rod 127 is adjusted to present the side face of the fork 143' to the edge of the arm 196, as represented in Fig. 3, the endwise movement of the starting rod produces no effect upon the angle-lever; but when the starting rod is adjusted to present the recessed edge of the cam-plate 200 to the arm 196, the lower edge of the latter rests upon the inclined cam 'ge 203, and the endwise movement of the starting rod to start the machine causes the arm 196 to ride up the cam edge 203, thereby tilting the elbow-lever and disengaging the hook 179 from the lip 193 to drop the several pawls into operative relation with the rack-bar, as represented in Fig. 14, wherein the angle-lever is represented in its pawl-releasing position by engagement of the end of the lip 193 with the nose of the hook 179, under which condition the retraction of the starting lever to initial position causes the engagement of the upper extremity of the cam-plate 200 with the side of the lever-arm 196 thereby causing it to rock into the dotted line position of Fig. 18 in opposition to the spring 204 surrounding the pivotal screw-pin 199 which normally maintains it in the full line position of Fig. 18.

Upon the side of the lever-arm 194 is the screw-stud 205 affording a fulcrum for the tripping arm 206 which is laterally offset above the detent-lip 193 and provided upon its forward edge with the lateral nose-piece 207 normally resting upon the substantially circular periphery of the cam-disk 208 fixed upon the cutter-actuating shaft 77 and provided upon one side with the cam projection 208'. At its rearward edge, the tripping arm is formed with a lateral stop flange 209 adapted to rest against the adjacent edge of the lever-arm 194 in engagement with which it is yieldingly held by pressure thereon of one end of a flat spring 210 whose opposite end has at one edge the apertured ear 211 secured upon the arm 194 by the fastening screw 212. The strength of the spring 210 is such that when the arm 196 is free, in the relation of the parts shown in Fig. 3, the members 194 and 206 are maintained in normal relation as represented in Figs. 13 and 14 under the action of the cam 208, which serves to rock the elbow-lever 194 196 to release the pawls for operation upon the rack-bar, as in Fig. 14; but when the arm 196 is locked in initial position by engagement of the shoulder 202 of the recess 201 in the cam-plate 200, as represented in Fig. 18, the elbow-lever is positively maintained in pawl-detaining position, and the action of the cam-disk 208 is merely to thrust aside the tripping arm 206 in opposition to its spring 210. The machine represented in the drawings, as thus far described, contains controlling means which not only insures the successive operation of the fabric-cutting and stitch-forming mechanisms, but contains provision for determining at the will of the operator the order in which such mechanisms will operate. Such provision includes the alternatively acting throw-in elements 129 and 203 operable respectively upon the means for inaugurating the action of the cutting and the stitch-forming mechanisms, and the hold-out elements 130 and 202 whereby a second actuation of either of the said inaugurating means during a buttonhole producing cycle is prevented.

Secured to the rear of the base 1 by screws 213 is the foot 214 of a bearing bracket 215 within which is slidingly fitted the stop-bar 216 formed in one side with a key-way 217 which is in practice entered by the point of the screw 218 to prevent the same from turning. The bar 216 has secured to its rearward end the thrust-collar 219 having a facing 220 of leather or other suitable material to receive the impact of a thrust-block 221 secured to the side of the push-bar 148. The bracket 215 is formed in its rearward face with a longitudinal slot 222 having in the upper side a series of spaced notches 223 adapted to receive the lateral pin 224 upon a collar 225 swiveled upon the end of the stop-bar 216. By turning the pin 224 into horizontal position, the stop-bar may be moved longitudinally to bring the thrust-collar 219 into the proper position of adjustment, and the pin 224 entered into the corresponding notch 223 to lock the stop-bar in position. The position of the stop-collar 219 lengthwise of the machine obviously determines the initial position of the push-bar 148 under the action of its returning spring 151, and thus determines the length of the arc through which the feed-wheel 36 is turned by the action of the pawl 145 in the traverse of the push-bar from initial position to its fixed extreme retracted position, as represented in dotted lines in Fig. 3; and this initial partial rotation of the feed-wheel determines the length of travel of the work-holder from cutting position to that in which the stitching is begun, and therefore determines the length of the stitched buttonhole produced by the machine.

Fulcrumed upon the screw-stud 226 tapped into the top of the bearing member 214 is a laterally swinging lever 227 having upon its upper face the screw-pin 228 upon which is pivoted the tappet-plate 229 carrying the depending pin 230 normally maintained in contact with the rearward edge of the lever 227 by means of a spring 231 surrounding the screw-pin 228, thereby maintaining the inclined cam edge 229' of the plate 229 in inclined relation with the adjacent forward edge of the lever 227 beyond which it projects, as represented in Fig. 2. The rearward edge of the lever 227 at its free end is adapted to engage a stud-pin 232 upon the extremity of the forwardly extending arm 233 of a rock-lever fulcrumed upon the fixed stud-screw 234 and provided with an oppositely projecting arm 235 having a backwardly offset extremity carrying the contact-screw 236 secured in the desired position of adjustment therein by means of the lock-nut 237. The arm 235 is normally pressed backwardly with the side of its contact screw 236 resting against the side of the arm 66 as represented in Figs. 1 and 2, of the stop-motion sleeve 65 by means of the spring 238 interposed between the same and the bottom of a recess near the base of the standard 3, and the throw of this arm under the action of its spring is limited by contact of its opposite edge with the inner wall 239 of a notch formed in the under side of a block 240 secured by means of the screw 241 upon the bed-plate 2. When the sleeve 65 is rocked by engagement of the roller-stud 149 with the depending tappet-arm 67, the arm 66 is depressed as represented in dotted lines in Fig. 3, and the rock-lever 233, 235 is shifted under the action of the spring 238 to bring the rearward edge of the arm 235 into engagement with the shoulder 239 and the point of the screw 236 above the top of the arm 66 whereby the latter is detained to cause the stop-lever 59 to remain in running position, as represented in dotted lines in said figure.

The cross-member 29 of the work-holder slide-frame has secured thereon by means of the fastening screw 242 passing through the elongated aperture 243 the plate 244 carrying at its rearward edge a stop-lug 245 having in its upper edge several notches which form with the rearward edge of the plate 244 a series of stop-shoulders 246, 247, 248 and 249 arranged at different levels and each adapted to contact with the wedge-shaped nose or extremity of the tappet-plate 229 in one of its several positions of vertical adjustment. The thrust-collar 219 carries a lateral stud 250 adapted for engagement with the lower inclined edge 251 of a depending lip 252 of the lever 227. When the stop-bar is wholly retracted, as represented in Fig. 3ª, the lever 227 is caused to rest upon the bed-plate with the nose of the tappet-plate 229 at the level of and in the path of movement of the lower tripping shoulder 246. In the initial advance of the clamp toward the front end of the work-holder, the plate 244 with its tripping lug 245 brushes past the nose of the tappet-plate 229 which yields in opposition to its spring 231, so that no effect is produced thereby upon the lever 227; but upon the retrograde movement of the work-holder the tripping shoulder 246 encounters the inclined edge 229' of the tappet-plate which retains a fixed relation to the carrying lever 227 which latter is thus thrust aside, thereby engaging the stud-pin 232 and rocking the lever 233 235 to disengage the point of its contact-screw 236 from the stop-lever arm 66, thereby permitting the stop-lever 59 to assume stopping position under the action of the spring 62. By adjusting the stop-bar 216 into suitable position for other lengths of buttonholes, the stud 250 is moved so as to engage the inclined edge 251 of the lip 252, thereby raising the carrying lever 227 of the tappet-plate 229 into the required position for engagement of the tappet-plate by other shoulders of the stop-lug 245, thereby providing for the later tripping of the stop-motion to arrest the operation of the main-shaft, and hence of the stitch-forming and feeding mechanisms, to provide for production of longer buttonholes. In this machine, as represented in the drawings, the lower cutting knives require to be changed to provide for the cutting of a slit or slits commensurate with different lengths of traverse of the work-holder for the different sizes of buttonholes.

As represented in Fig. 3ª, the top of the bearing member 214 is recessed to receive a coil-spring 253 by means of which the lever 227 is maintained in the normal position with its inner edge resting against the coresponding face of the stop-lug 245.

As described more fully in my said application Serial No. 718,804, the arm 165 has pivotally connected therewith the rearward end of the reciprocating pawl-bar 254 having the reduced operative portion 255 adapted for engagement with the segmental series of ratchet-teeth 144 of the feed-wheel 36 and to operate idly at certain times in the gap 144' intermediate the ends thereof. This pawl-bar passes through the fixed hanger 256 upon which is pivotally mounted a plural-armed lever having an arm 257 with upturned flange 258 in contact with which the pawl-bar 254 is yieldingly pressed, and another arm 259 connected by means of the pitman 260 with the depending arm 261 of an angle-lever fulcrumed upon the fixed screw-stud 262 and having a rearwardly extending arm 263 carrying a stud-screw 264 upon which is hung the depending link 265. The link 265 is notched in one edge to receive the end of a stud 266 projecting from the block 63 of the stop-lever, toward which it is pressed by means of the spring 267. When the stop-lever is tilted, in starting the machine, the stud 266 is retracted sidewise from the notch in the link 265, which rises under the action of the spring 268 applied to the lever-arm 259, and the pawl-bar 254 is retracted from operative relation with the feed-wheel. When the stop-lever is shifted to stop the machine, the stud 266 is thrown into contact with the rearward face of the link 265, and snaps into its notch when the slide-block 63 is lifted by engagement with the clutch device of the stop-motion preparatory to the final descent in arresting the movement of the main-shaft, wherein the link is drawn downwardly and the pawl-bar 254 thereby caused to reassume operative relation with the ratchet-teeth 144 of the feed-wheel which it continues to engage in rotating the feed-wheel until its point encounters the gap 144' in which it continues to move idly while the feed-wheel remains in initial starting position.

As represented in Fig. 4, the starting rod has secured thereon by screws 269 the hub 270 of a disk 271, the forward face of which is engaged by the rounded upper extremity of the upright arm 272 of a bell-crank-lever fulcrumed upon the stud-screw 273 and provided with a lateral arm 274 formed with an eye in which is secured the upper end of a chain 275 which is in practice attached to a knee lever or treadle beneath the base of the machine.

In adjusting the machine for cutting the buttonhole slit before the stitching operation, the starting rod 127 is turned by means of the knob 133 to bring the pin 132 into the upper aperture 135 of the base, as represented in Figs. 1, 2, 3 and 4, thereby bringing the tappet-arm 129 in front of the depending arm 118 of the cutter-controlling lever 109, and the arm 130 into a position beneath the trip-lever wherein its engagement with the member 120' of the latter causes the lifting in opposition to the spring 126 of the trip-lever above the path of movement of the tripping point 125 carried by the feed-wheel. In this adjustment of the starting rod, the side of the yoke portion 143' of the collar 143 is presented as a rest or support for the lateral arm 196 of the pawl-controlling angle-lever. In the initial position of the parts, the work-holder is disposed in cutting position intermediate the retracted and separated fabric engaging elements of the cutting device and the position assumed by the work-holder during a stitching operation. The stop-bar 216 is set in a position such that the travel of the push-bar 148 to extreme position with its feed-wheel actuating pawl 145 will produce the requisite partial rotation of the feed-wheel to produce a rapid movement of the work-holder from cutting position to a position suitable for receiving the initial edge-covering stitches of a buttonhole of the desired length.

To start the machine, the chain 275 is drawn downward and the bellcrank turned to impart the requisite endwise movement to the starting rod, wherein the tappet-arm 129 engages the depending arm 118 of the cutter controlling lever and shifts the latter to cause the coupling of the belt-wheel 99 with the clutch-disk 104 to produce a single rotation of the cutter-shaft. The rotation of the several cutter-actuating cams causes the bodily advance of the cutter-levers and the closing of the same to cut the slit followed by their separation and retraction to initial position, just before the conclusion of which the action of the peripheral projection 208' of the cam-disk 208 upon the nose of the tripping arm 206 causes the tilting of the angle-lever 194 196 and disengagement of the detent-shoulder 193 from the hook 179 of the primary holding pawl and consequent descent of the several pawls into operative relation with the rack-bar. The continuously reciprocating pawl-lever 158 operates in conjunction with the main detent-pawl 177 upon the rack-bar 156 to impart a rapid step-by-step endwise movement of the push-rod 148, thereby causing the pawl 145 to impart a partial rotation to the feed-wheel and consequent travel of the work-holder to stitching position. As the pawl-lever 158 performs its retractive movement after engagement with the last regular tooth of the rack-bar, its tooth 159 rides up the abruptly inclined face 157' of the final tooth thereby directing the end of its tripping finger 160 toward the lateral lug 180 of the main holding pawl which causes the latter to rise to bring its hook 179 above the detent-lip 193 which snaps beneath the same under the action of the spring 198 upon the angle-lever 194 196. while the upper edge 177' of the main holding pawl engages the stud-pin 188 of the pawl-lever 158 and lifts the same wholly out of engagement with the rack-bar. To insure against the retraction of the rack-bar under the action of its returning spring 151 before the primary holding pawl and the operating lever have been raised entirely clear of the rack-teeth, the operative extremity 183 of the auxiliary holding pawl 182 is caused to depend slightly below the tooth 178 of the main holding pawl and to engage only a single tooth 185 at the side of the rack-teeth 157, and this detains the rack-bar in its advance position until the lost motion between the upper edge of the main holding pawl and the lug 184 is taken up and these parts are engaged, when the final lifting movement of the main holding pawl causes the retraction of the auxiliary pawl and the consequent release of the rack-bar 156 and push-bar 148 for return to initial position. It will be observed that as the push-bar 148 arrives at extreme advance position under the action of the ratchet-and-pawl mechanism above described, the stud 149 engages the tappet-arm 67 which causes the tilting of the stop-lever 59 to start the machine, the stop-lever being maintained in running position by the engagement of the upper edge of the tappet-arm 66 with the point of the screw 236 of the detaining angle-lever 233 235. During the continued operation of the main-shaft 6 as thus set in motion, the stitch-forming and clutch-actuated primary feeding mechanism continue in operation, the stitching mechanism receiving a partial rotation in the stitching of the eye of the buttonhole. As before explained, the advance of the work-holder toward the front end of the machine in stitching the first side of the buttonhole causes the tripping lug 245 to turn the tappet-plate 229 without affecting the position of its carrying lever 227; but in the retrograde movement of the work-holder in the stitching of the second side of the buttonhole, the engagement of the tripping lug with the tappet-plate in its fixed relation with the lever 227 causes the latter to be thrust aside and into engagement with the stud-pin 232, thereby shifting the detaining lever 233 235 and disengaging the contact-screw 236 from the tappet-arm 66, and thus permitting the stop-lever 59 to return to initial stopping position under the action of its spring 62, whereby the main-shaft 6 is stopped and the stitch-forming and feeding mechanisms are brought to rest. The return of the stop-lever 59 to initial stopping position, and the rise and fall of the slide-block 63 in effecting the unclutching of the members 57 and 58 causes a rocking of the plural-armed lever 261, 263, which throws the previously retracted pawl-bar 254 into operative relation with the toothed portion of the periphery of the feed-wheel, thereby causing the latter to perform a final partial rotation to complete a full rotation whereby the work-holder is retracted into initial cutting position and the stitching mechanism is given a return semi-rotation into initial position in readiness for the succeeding stitching operation.

In order to set the starting rod to reverse the order of the cutting and stitching operations, the knob 133 is retracted in opposition to the spring 136 and the pin 132 withdrawn from the upper bed-plate aperture 135 into the lower one, in which position the lateral movement of the pin is arrested by engagement with the stop-member 140. In this position of the starting rod, the arms 129 and 130 are turned out of operative relation with the parts 118 and 120', the trip-lever 120, 123 descending under the action of its spring 126 with its hub resting upon the head of the stud 121, and the arm 123 assuming a position within the path of movement of the tripping point 125. In this adjustment, the collar 143 is turned at right angles to its previous position so that the angle-lever arm 196 rests upon the inclined edge 203 of the cam-plate 200 and is embraced by the recess 201 of the latter, as represented in Fig. 18. The actuation of the starting rod by means of the chain 275 now causes the lateral movement of the cam edge 203 to raise the arm 196, thereby tilting the angle-lever 194, 196 and disengaging the detent lip 193 from the hook 179 of the main holding pawl to permit the several pawls to assume operative relation with the rack-bar 156 and the travel of the push-bar 148 to impart the initial travel of the work-holder from cutting to initial stitching position and the tilting of the stop-lever to start the stitching mechanism, as previously described. During this operation, the angle-lever 194 196 is restrained against return to initial position by engagement of the end of the lip 193 with the adjacent end of the hook 179, but the rise of the main holding pawl under the action of the pawl-lever 158 as previously described permits the lip 193 to enter beneath the hook 179 and the descent of the arm 196 to permit the return of the cam-plate 200 from its displaced dotted line position (Fig. 18) to normal position wherein its shoulder 202 affords a latch for positively preventing the subsequent rise of the arm 196 in the same cycle of operation of the machine. The action of the mechanism in the stitching and feeding operations is as before described, and at the end of the final turning movement of the feed-wheel under the action of the pawl-bar 254 the encounter of the tripping point 125 with the arm 123 of the trip-lever for the cutting mechanism causing the rocking of such trip-lever and the shifting of the arm 118 of the cutter-controlling lever 109 by the fork 119 of the trip lever-arm 120 to cause a rotation of the cutter-shaft, and hence a cutting action succeeding the initial stitching operation. At the completion of the rotation of the cutter-shaft, the peripheral projection 208' of the cam-disk 208 acts upon the nose 207 of the tripping arm 206, but as the angle lever 194 196 is now locked by the member 200 against movement upon its fulcrum, the tripping arm 206 is nearly thrust aside upon its pivotal stud 205 in opposition to the spring. 210, the several pawls for controlling the push-bar 148 remaining disengaged from the rack-bar 156, and the cycle of the machine terminating with its action.

In the machine forming the subject of my Patent No. 1,024,490 of April 30, 1912, an endwise movable rod 385, sustained by the bracket-arm parallel with the main-shaft, is employed for setting the machine in motion. I have made use of a similar rod in the present machine to set in motion automatically acting shifting means for the starting rod 127 in lieu of the bellcrank-lever 272 274, as more fully shown and described in my pending application Serial No. 776,506, filed June 30, 1913, and it is therefore to be understood that the present improvement includes not only a combination of manually and automatically acting means for setting the cutting mechanism in action, but means which are automatically actuated in both adjustments of the starting rod to effect the cutting of the buttonhole slit alternatively either before or after the stitching operation.

As will be readily seen, when the starting rod is set for effecting the cutting of the buttonhole slit after the stitching operation, the control of the actuation of the cutting mechanism and the timing of the cutting action is effected through a train of mechanism including the cam-plate 200, pawl-detainer 193, 194, 196, ratchet-mechanism comprising the pawls 158, 177 and 182 with the reciprocally movable rack-bar 156, the push-bar 148, pawl 145, feed-wheel or trip-carrying member 36, tripping point 125, trip-lever 120, 123, and controlling lever 109. The adjustment of the stop-bar 216 serves, not only to determine the period of action of the pawl mechanism upon the push-bar 148 with its pawl 145, constituting an initially acting accelerating mechanism for the feed-wheel or trip-carrying member, but to determine the duration of the operation of the primary actuating mechnism (including the clutch-dogs 48) through the control of the stop-motion and hence the period of action of the subsequently operating accelerating mechanism comprising the pawl-bar 254 which derives its operative movements from the same rock-shaft (163) as the actuating pawl-lever or pawl 158.

As will be observed, the primary object of replacing one complete lower cutting element with the other in the present construction as above described is to utilize a straight knife-blade of given length with eyed portions of different sizes, the cutters thus constituted differing only in the eye portions. In the modification represented in Fig. 12, the same idea is embodied in a cutter composed of a single straight cutting blade and relatively movable interchangeable eye portions either of which is adapted to be set in operative relation with the blade portion. In the figure referred to, the blade portion 90' is provided with a foot 90'' which is secured for sidewise adjustment upon a seat 82'. of the cutter-lever head 82 by means of the screw 90'''. The head 82 is formed with an undercut-edged channel 83 somewhat narrower than that of the form of the improvement represented in Fig. 6, but otherwise similar thereto, to receive the slide-plate 84' sustaining the blocks 85'' and 86'' which are secured thereto by means of the fastening screws 87' passing through slots therein and through the gibs 85''' and 86''' and tapped into the plate 84' for lateral adjustment. Upon each of the blocks 85'' and 86'' is secured by means of the screw 94' the base-plate 89' of the eye or punch portion 92' and 93' respectively each of which is adapted to be set in register with the blade 90' to complete the cutter for cutting a buttonhole slit with an eyed end. As in the construction represented in Fig. 6, one edge of the slide-plate 84' is provided with spaced detent-notches 98' in register with the punches 92' and 93', and with an intermediate detent-notch 98'' adapted for engagement by the locking spring 97 to detain both of the punches out of operative relation with the blade 90' so that the latter will operate with the upper cutting block or anvil to produce a straight buttonhole slit without the enlarged end portion, as is required in certain classes of work.

As will be observed, the head 82 has tapped into its end a stop-screw 276 whose head projects slightly above the bottom of the channel 83 so as to afford a positive stop for the slide-block 84 in one of its extreme positions. In practice a similar stop-screw is provided at the opposite end of the channel 83 for a like purpose when the slide-block is shifted to opposite extreme position. It will be observed by reference to Figs. 5 and 6 that the head of the stop-screw is cut away upon one side so that by turning it slightly the slide-block 84 is readily removable with its cutter for replacement by a set of cutters having blades of different length. The same expedient may obviously be used in cases wherein it is undesirable to extend the head 82 laterally as shown in the drawings, and in lieu thereof to replace a narrower cutter-block carrying a single cutter with a similar cutter-block also carrying a single cutter of different shape or dimension, the characteristic feature of the present improvement in this respect being the provision for convenient replacement of one cutting element or portion thereof with another to compensate for variations in timing of the cutting operation relatively to the stitching operation; although the present improvement is applicable in certain aspects to machines wherein no provision is made for changing this timing of operation of the parts.

From the foregoing description, it will be observed that the specific construction described and represented in the accompanying drawings constitutes the preferred embodiment of the improvement, but that the various parts are susceptible of wide modification in construction and arrangement within the scope of the invention.

Having thus set forth the nature of the invention, what I claim herein is:—

1. In a buttonhole sewing machine, in combination, stitch-forming mechanism, cutting mechanism, automatically acting means for effecting in the same buttonhole-producing cycle the operation of either of said mechanisms succeeding the operation of the other, and means whereby either may be initially set in operation selectively at the will of the attendant.

2. In a buttonhole sewing machine, in combination, stitch - forming mechanism, operating means therefor, a cutting device, actuating means therefor, independent automatically acting means and manually controlled means for coupling said stitch-forming mechanism with its operating means, and means whereby one of said coupling means may be rendered effective while the other remains ineffective in performing its normal function.

3. In a buttonhole sewing machine, in combination, stitch - forming mechanism, actuating means therefor, a work-holder, feeding mechanism for producing relative traveling movements between the stitch-forming mechanism and the work-holder to space the stitches, means for controlling the period of operation of the stitch-forming mechanism, a cutting device, means whereby the cutting device may be thrown in operation at will by a connection with the stitch-forming mechanism controlling means or independently thereof, and automatically acting means adapted for control by the cutting device for setting the stitch-forming mechanism in operation subsequently to a cutting operation.

4. In a buttonhole sewing machine, in combination, stitch - forming mechanism, actuating means therefor, a work-holder, feeding mechanism for producing relative traveling movements between the stitch-forming mechanism and the work-holder to space the stitches, means for controlling the period of operation of the stitch-forming mechanism, a cutting device, means for producing relative turning movements between the stitch-forming mechanism and the cutting device, means whereby the cutting device may be thrown in operation at will by a connection with the stitch-forming mechanism controlling means or independently thereof, and means whereby the operation of the stitch-forming mechanism may be caused to follow that of the cutting mechanism in the same buttonhole-producing cycle.

5. In a buttonhole sewing machine, in combination, stitch - forming mechanism, actuating means therefor, a work-holder, feeding mechanism for producing relative traveling movements between the stitch-forming mechanism and the work-holder to space the stitches, means for controlling the period of operation of the stitch-forming mechanism, a cutting device, means whereby the stitch-forming mechanism and cutting device may be actuated successively, and means whereby the cutting device may be thrown into operation at will by a connection with the feeding mechanism or independently thereof.

6. In a buttonhole sewing machine, in combination, stitch - forming mechanism, turning means therefor, a work-holder, means for producing relative feeding movements between the stitch-forming mechanism and the work-holder, a buttonhole cutting device, and means including an adjustable element for actuating the cutting device either before or after a stitching operation during a single cycle of operation of the machine.

7. In a buttonhole sewing machine, in combination, stitch - forming mechanism, turning means therefor, a work-holder, means for producing relative feeding movements between the stitch - forming mechanism and the work-holder, a buttonhole cutting device, means for producing relative traveling movements between the stitch-forming mechanism and the cutting device, and means including an adjustable element for actuating the cutting device either before or after a stitching operation during a single cycle of operation of the machine.

8. In a buttonhole sewing machine, in combination, stitch-forming mechanism, a work-holder, means for producing relative feeding movements between the stitch-forming mechanism and the work-holder, a cutting device, means for producing relative turning movements between the cutting device and the stitch-forming mechanism, and means including an adjustable element and adapted to time the action of the cutting device to occur either before or after the operation of the stitch-forming mechanism during a single cycle of operation of the machine.

9. In a buttonhole sewing machine, in combination, stitch-forming mechanism comprising a needle and mounted to turn upon an axis substantially parallel with the needle, a work-holder, means for producing relative feeding movements between the stitch-forming mechanism and the work-holder, a cutting device, means for producing turning movements of the stitch-forming mechanism upon said axis relatively to the work-holder and the cutting device, and mechanism for actuating the cutting device and including controlling means adapted to be set to throw the cutting device into action either before or after the operation of the stitch-forming mechanism.

10. In a buttonhole sewing machine, in combination, stitch-forming mechanism, a work-holder, means for producing relative feeding movements between the stitch-forming mechanism and the work-holder, a buttonhole cutting device, means including an adjustable element for actuating the cutting device alternatively before or after a stitching operation, and automatically acting means whereby the stitch-forming mechanism is set in operation after an initial operation of the cutting mechanism.

11. In a buttonhole sewing machine, in combination, stitch-forming mechanism, actuating means therefor, a work-holder, means for producing relative feeding movements between the stitch-forming mechanism and the work-holder, a cutting device, actuating means therefor acting independently of the feeding means, means for producing relative turning movements between the cutting device and the stitch-forming mechanism, and means whereby the relative timing of the sequence of action of the stitch-forming and the cutting mechanisms may be varied during a single cycle of operation of the machine.

12. In a buttonhole sewing machine, in combination, stitch-forming mechanism, cutting mechanism, means for producing relative turning movements between the stitch-forming and cutting mechanisms, and means controlled to act at will either before or after the operation of the stitch-forming mechanism for setting the cutting mechanism in operation during a single cycle of operation of the machine.

13. In a buttonhole sewing machine, in combination, stitch-forming mechanism, actuating means therefor, cutting mechanism, actuating means therefor, coupling means acting to successively connect the stitch-forming and cutting mechanisms with their respective actuating means in each cycle of operation of the machine, controlling means including an adjustable element and adapted to be timed in its action to effect through said coupling means the operation of said mechanisms in different orders, and means for maintaining said adjustable element of the controlling means in either of its positions of adjustment throughout successive buttonhole-producing operations.

14. In a buttonhole sewing machine, in combination, stitch-forming mechanism, a cutting device, actuating means therefor, a work-holder initially positioned to present the work to the cutting device, feeding mechanism for imparting relative traveling movements between the stitch-forming mechanism and the work-holder, automatically acting means including a controlling connection with the cutting device whereby a stitching operation may be caused to follow a cutting action in the same cycle of operation of the machine, and means acting alternatively at the beginning or completion of said traveling movements for setting the cutting device in operation.

15. In a buttonhole sewing machine, in combination, stitch-forming mechanism, a cutting device, actuating means therefor, a work-holder initially positioned to present the work to the cutting device, means for shifting the work-holder into operative relation with the stitch-forming mechanism and returning it to initial position, means actuated independently thereof for imparting to the work-holder feeding movements to space the stitches, and means including an adjustable element whereby the cutting mechanism may be set in operation previous to the beginning or subsequent to the end of the travel of the work-holder from and return to its initial position.

16. In a buttonhole sewing machine, in combination, stitch-forming mechanism and a cutting device operable in different positions, a work-holder, means for shifting the work-holder from one to the other of said positions to present the work successively for the cutting and stitching operations, and means adapted to act alternatively in setting in operation the stitch-forming mechanism and cutting device either in the order named or in the reverse order.

17. In a buttonhole sewing machine, in combination. stitch-forming mechanism, cutting mechanism including relatively movable carriers with a plurality of cutting elements sustained by and laterally movable upon one of said carriers and adapted for coöperation with a cutting element upon the other carrier, independent actuating means whereby said mechanisms may be operated successively, and means for effecting the coupling of each of said mechanisms with its respective actuating means and adapted to be set at will to determine the order in which said mechanisms operate.

18. In a buttonhole sewing machine, the combination with stitch-forming and feeding mechanisms, of buttonhole cutting mechanism comprising a cutter-carrier and a plurality of cutters sustained by said carrier and adapted to be shifted to occupy successively an initial position thereon.

19. In a buttonhole sewing machine, the combination with stitch-forming and feeding mechanisms, of buttonhole cutting mechanism comprising a cutter-carrier formed with a seat, a cutter-block sustained by and adapted to assume different positions upon said seat, and a plurality of cutters mounted upon said cutter-block.

20. In a buttonhole sewing machine, the combination with stitch-forming and feeding mechanisms, of buttonhole cutting mechanism comprising a cutter-carrier formed with a seat, a sliding cutter-block sustained by and movable upon said seat, and a plurality of cutters secured upon said cutter-block.

21. In a buttonhole sewing machine, the combination with stitch-forming and feeding mechanisms, of buttonhole cutting mechanism comprising a cutter-carrier, a cutter-block movably sustained by said carrier, a plurality of cutters secured upon said cutter-block, and a latch device for maintaining said cutter-block in different positions upon said carrier.

22. In a buttonhole sewing machine, the combination with stitch-forming and feeding mechanisms, of buttonhole cutting mechanism comprising a cutter-carrier, a cutter-block sustained by and movable upon said carrier and having means for guiding it in a fixed path thereon, a plurality of cutters, and means whereby said cutters may be adjusted upon said block for movement interchangeably into an initial operative position by the shifting of the block.

23. In a buttonhole sewing machine, the combination with stitch-forming and feeding mechanisms, of buttonhole cutting mechanism comprising a cutter-carrier, a cutter-block sustained by and movable upon said carrier, a plurality of cutters, and means for securing said cutters adjustably upon said block.

24. In a buttonhole sewing machine, the combination with stitch-forming and feeding mechanisms, of buttonhole cutting mechanism comprising a cutter-carrier, a plurality of cutters movably mounted thereon, and a positively acting latch device for locking said cutters interchangeably in operative position upon said carrier.

25. In a buttonhole sewing machine, the combination with stitch-forming and feeding mechanisms, of buttonhole cutting mechanism comprising a cutter-carrier, cutting elements movably mounted thereon and comprising a plurality of punches for removing sections of material and each adapted to replace the other in an initial operative position on said carrier, and means whereby said punches may be locked in said position.

26. In a buttonhole sewing machine, the combination with stitch-forming and feeding mechanisms, of buttonhole cutting mechanism comprising in combination, two cutter-carriers adapted for relative reciprocal movement with respect to each other, a blunt cutting element sustained by one of said carriers, and a plurality of edged cutting elements movably mounted upon the other of said cutter-carriers and adapted to assume successively operative relation with said blunt cutting element.

27. In a buttonhole sewing machine, the combination with stitch-forming and feeding mechanisms, of buttonhole cutting mechanism comprising in combination, two cutter-carriers adapted for relative reciprocal movement with respect to each other, a blunt cutting element sustained by one of said carriers, and a plurality of edged cutting elements adjustably and interchangeably mounted upon the other of said cutter-carriers and each adapted to assume operative relation with said blunt cutting element.

28. In an eyelet buttonhole sewing machine, in combination, stitch-forming mechanism, a work-holder, means for producing relative traveling and turning movements between the stitch-forming mechanism and the work-holder, two cutter-carriers adapted for relative reciprocal movement with respect to each other, a blunt cutting element sustained by one of said carriers, and a plurality of edged cutting elements composed of blades of equal length terminating at one end in punches of different size, said edged cutting elements being movably mounted upon the other of said carriers and adapted to be shifted to bring a selected edged cutting element into operative relation with said blunt cutting element.

29. In a buttonhole sewing machine, the combination with stitch-forming mechanism, of a cutting device comprising a cutting element and a plurality of opposed cooperating cutting elements each adapted to replace the other in operative relation with the first-named cutting element.

30. In a buttonhole sewing machine, in combination, stitch-forming mechanism, cutting mechanism, means for insuring the operation of said mechanisms in succession in each cycle of operation of the machine, and different sets of controlling means each independent of the other and adapted to set initially in operation respectively the stitch-forming mechanism and the cutting mechanism.

31. In a buttonhole sewing machine, in combination, stitch-forming mechanism, controlling means for setting the same in operation, cutting mechanism, controlling means for setting the cutting mechanism in operation, means whereby said mechanisms are caused to operate in succession during a single cycle of operation of the machine, and starting means adjustable for action upon either of said controlling means at will.

32. In a buttonhole sewing machine, in combination, stitch-forming mechanism, means including two independently actuated controlling devices for setting the same in operation, a cutting mechanism, means including two independently actuated controlling devices for setting said cutting mechanism in operation, an element of one of the controlling means for one of said mechanisms deriving operative movements from a connection with the other of said mechanisms, and means whereby one of said controlling devices for each of said mechanisms is maintained ineffective while the other is effective in performing its normal function.

33. In a buttonhole sewing machine, in combination, stitch-forming mechanism, means including two independently actuated controlling devices for setting the same in operation, a cutting mechanism, means including two independently actuated controlling devices for setting said cutting mechanism in operation, an element of one of the controlling means for one of said mechanisms deriving operative movements from a connection with the other of said mechanisms, and a starting member provided with two sets of throw-in and hold-out members, of which one set is arranged for action upon one pair of controlling devices while the other set remains ineffective; and vice versa.

34. In a buttonhole sewing machine, in combination, cutting mechanism, and controlling means therefor including a rack-bar, a reciprocating actuating pawl and a holding pawl adapted for engagement with said rack-bar, pawl-lifting means operated by said actuating pawl, a pawl-detainer, and means for retracting said pawl-detainer.

35. In a buttonhole sewing machine in combination, cutting mechanism, and controlling means therefor including a rack-bar, a reciprocating actuating pawl, and primary and auxiliary holding pawls adapted for engagement with said rack-bar, means whereby the lifting of one of said pawls effects the lifting of the others and the disengagement of the auxiliary holding pawl after the others, pawl-lifting means operated by said actuating pawl, a pawl-detainer, and retracting means for said pawl-detainer.

36. In a buttonhole sewing machine, in combination, cutting mechanism, and controlling means therefor including a rack-bar, a reciprocating actuating pawl, a tappet partaking of its reciprocating movements, a holding pawl, a thrust element connected therewith and normally out of the path of movement of the tappet for lifting both pawls, means for effecting the operative engagement of said tappet and thrust element to effect the lifting of the pawls, a pawl-detainer, and means for retracting said pawl-detainer.

37. In a buttonhole sewing machine, in combination, cutting mechanism, and controlling means therefor including a rack-bar, a reciprocating actuating pawl provided with a tappet-finger, a holding pawl carrying a thrust element sustained out of the normal path of movement of said tappet-finger, means for establishing connection between said pawls, means whereby said tappet-finger is deflected into engagement with said thrust element for lifting said pawls, a pawl-detainer, and retracting means therefor.

38. In a buttonhole sewing machine, in combination, cutting mechanism, and controlling means therefor including a rack-bar, a reciprocating actuating pawl provided with a tappet-finger, a holding pawl carrying a thrust element sustained out of the normal path of movement of said tappet-finger, means for establishing connection between said pawls, means carried by said rack-bar whereby said tappet-finger is deflected into engagement with said thrust element for lifting said pawls, a pawl-detainer, and retracting means therefor.

39. In a buttonhole sewing machine, in combination, cutting mechanism, and controlling means therefor including a spring-retracted rack-bar, pawl-mechanism for imparting thereto endwise movements, means for establishing and interrupting operative relation between said rack-bar and pawl-mechanism, and adjustable means for determining the initial position of said rack-bar, to vary the time of operation of the cutting mechanism.

40. In a buttonhole sewing machine, in combination, cutting mechanism, and controlling means therefor including a trip-carrying member for setting the cutting mechanism in action, primary actuating means for said member, accelerating means for said member, and means for adjusting the period of action of said accelerating means.

41. In a buttonhole sewing machine, in combination, cutting mechanism, and controlling means therefor including a trip-carrying member for setting the cutting mechanism in action, primary actuating means for said member, accelerating means for said member including a reciprocally movable part, and means for adjusting the length of travel of said part.

42. In a buttonhole sewing machine, in combination, cuttting mechanism, and controlling means therefor including a trip-carrying member for setting the cutting mechanism in action, primary actuating means for said member, accelerating means active upon said member both before and after the action thereon of the primary actuating means, and means for adjusting the extent of action of said accelerating means upon said trip-carrying member.

43. In a buttonhole sewing machine, in combination, cutting mechanism, and controlling means therefor including a trip-carrying member for setting the cutting mechanism in action, primary actuating means for said member, accelerating means active upon said member both before and after the action thereon of the primary actuating means, and means including a common adjustable element for correspondingly varying the period of action of said accelerating means before and after the operation of said primary actuating means.

44. In a buttonhole sewing machine, in combination, cutting mechanism, and controlling means therefor including a trip-carrying member for setting the cutting mechanism in action, primary actuating means for said member, accelerating means having independent operative elements active upon said member both before and after the action thereon of the primary actuating means, and a common actuating member adapted to impart to both of said accelerating means their operative movements.

45. In a buttonhole sewing machine, in combination, cutting mechanism, and controlling means therefor including a trip-carrying member for setting the cutting mechanism in action, primary actuating means for said member, accelerating means having independent operative elements active upon said member both before and after the action thereon of the primary actuating means, and a common actuating member operative throughout the period of action of said trip-carrying member and adapted to impart to both of said accelerating means their operative movements.

46. In a buttonhole sewing machine, in combination, stitch-forming mechanism, cutting mechanism, means whereby each of said mechanisms is adapted to be set in operation through a connection with the other, and controlling means whereby the order of operation of said mechanisms may be changed.

47. In an eyelet buttonhole sewing machine, in combination, stitch-forming mechanism, cutting mechanism comprising an element formed with a cutting edge embracing a closed space whereby a section of material may be removed, controlling means whereby said mechanisms may be caused to operate in succession, and means for adjusting said controlling means for changing the order of operation of said mechanisms.

48. In an eyelet buttonhole sewing machine, in combination, stitch-forming mechanism, cutting mechanism comprising an element formed with a cutting edge embracing a closed space whereby a section of material may be removed, and means whereby said mechanisms may be set in operation successively and either may be caused to operate in advance of the other.

49. In a buttonhole sewing machine, in combination, stitch-forming mechanism, cutting mechanism comprising a cutter-carrier and a plurality of cutters sustained by said carrier and adapted to assume successively an initial operative position thereon, and means whereby said mechanisms may be set in operation successively and either may be caused to operate in advance of the other.

50. In a buttonhole sewing machine, in combination, stitch-forming mechanism, cutting mechanism, connections between said mechanisms for insuring their successive operation in each cycle of operation of the machine, and automatically controlled means for effecting the operation of said mechanisms in either of different orders predetermined by the operator.

51. In a buttonhole sewing machine, in combination, stitch-forming mechanism, actuating means therefor, cutting mechanism, actuating means therefor, coupling means acting to successively connect the stitch-forming and cutting mechanisms with their respective actuating means, and automatically acting controlling means operating in conjunction with said coupling means and adjustable to effect once only in each buttonhole producing operation the action of said mechanisms in different predetermined orders.

52. In a buttonhole sewing machine, in combination, stitch-forming mechanism, actuating means therefor, cutting mechanism, actuating means therefor, coupling means for operatively connecting each of said mechanisms with its respective actuating means, two sets of automatically operable controlling elements for throwing each of said coupling means into action, and adjustable means for insuring the inaction of either element of each set while the other is caused to perform its normal function.

In testimony whereof, I have signed my name to this specification, in the presence of two subscribing witnesses.

EDWARD B. ALLEN.

Witnesses:
STANLEY N. SMITH.
H. M. BURN.

Copies of this patent may be obtained for five cents each, by addressing the "Commissioner of Patents, Washington, D. C."